(12) United States Patent
Baldi et al.

(10) Patent No.: US 9,637,642 B2
(45) Date of Patent: May 2, 2017

(54) POLYMERIC GLASS BASED COMPOSITIONS FOR VITREOUS COATING

(71) Applicant: Colorobbia Italia S.P.A., Sovigliana Vinci (IT)

(72) Inventors: Giovanni Baldi, Montelupo Fiorentino (IT); Andrea Cioni, Empoli (IT); Valentina Dami, Larciano (IT)

(73) Assignee: COLOROBBIA ITALIA S.P.A., Sovigliana Vinci (IT)

( * ) Notice: Subject to any disclaimer, the term of this patent is extended or adjusted under 35 U.S.C. 154(b) by 0 days.

(21) Appl. No.: 14/771,356

(22) PCT Filed: Feb. 28, 2014

(86) PCT No.: PCT/IB2014/059340
§ 371 (c)(1),
(2) Date: Aug. 28, 2015

(87) PCT Pub. No.: WO2014/132237
PCT Pub. Date: Sep. 4, 2014

(65) Prior Publication Data
US 2016/0017155 A1 Jan. 21, 2016

(30) Foreign Application Priority Data
Mar. 1, 2013 (IT) .................. FI2013A0039

(51) Int. Cl.
| | |
|---|---|
| C03C 8/00 | (2006.01) |
| C09D 5/14 | (2006.01) |
| C23C 18/12 | (2006.01) |
| C08K 3/28 | (2006.01) |
| C08K 3/30 | (2006.01) |
| C08K 3/34 | (2006.01) |

(52) U.S. Cl.
CPC .................. *C09D 5/14* (2013.01); *C03C 8/00* (2013.01); *C08K 3/28* (2013.01); *C08K 3/30* (2013.01); *C08K 3/34* (2013.01); *C23C 18/122* (2013.01); *C23C 18/1212* (2013.01); *C23C 18/1241* (2013.01); *C23C 18/1283* (2013.01); *C03C 2204/02* (2013.01); *C03C 2207/04* (2013.01); *C03C 2207/10* (2013.01); *C08K 2003/3045* (2013.01)

(58) Field of Classification Search
CPC ... C03C 8/00; C03C 2204/02; C03C 2207/04; C03C 2207/10; C09D 5/14; C23C 18/122; C23C 18/1283; C23C 18/1241; C23C 18/1212; C08K 3/28; C08K 3/30; C08K 3/34; C08K 2003/3045
See application file for complete search history.

(56) References Cited

U.S. PATENT DOCUMENTS

| | | | | |
|---|---|---|---|---|
| 8,569,396 | B1 * | 10/2013 | Sloan | ............ C09D 5/14 523/122 |
| 2006/0086281 | A1 | 4/2006 | Poulet | |
| 2008/0305153 | A1 * | 12/2008 | Wang | .......... A01N 59/16 424/443 |

FOREIGN PATENT DOCUMENTS

| | | |
|---|---|---|
| DE | 202005006784 U1 * | 10/2005 |
| DE | 202005006784 U1 * | 10/2005 |
| JP | 10-279885 A * | 10/1998 |

OTHER PUBLICATIONS

International Search Report and Written Opinion dated May 12, 2014 for corresponding PCT patent application No. PCT/IB2014/059340.
International Preliminary Report on Patentability dated May 21, 2015 for corresponding PCT patent application No. PCT/IB2014/059340.

\* cited by examiner

*Primary Examiner* — Anthony J Green
(74) *Attorney, Agent, or Firm* — Abelman, Frayne & Schwab

(57) ABSTRACT

There are described new vitreous products having antibacterial properties for application to metal surfaces.

9 Claims, No Drawings

POLYMERIC GLASS BASED COMPOSITIONS FOR VITREOUS COATING

CROSS REFERENCE TO RELATED APPLICATIONS

This application is a national phase of PCT application No. PCT/IB2014/059340, filed Feb. 28, 2014, which claims priority to IT patent application No. FI2013A000039, filed Mar. 1, 2013, all of which are incorporated herein by reference thereto.

FIELD OF THE INVENTION

The present invention relates to the field of hybrid inorganic-organic coatings for coating metal surfaces with polymeric glasses, in particular to the preparation of antibacterial transparent coatings and colored coatings.

BACKGROUND ART

As is known, the metal surfaces of many everyday objects are exposed to the attack of different substances (from simple atmospheric agents to those used in the various using methods), which in the long term change their initial appearance; for example, these coulth be the stainless steel surfaces used for stove tops exposed to the effect of heat, acids, abrasive substances, sharp blades, etc.

It is therefore necessary to protect these surfaces so as to maintain their initial features intact for as long as possible.

Products that have most recently come into use for the aforesaid purposes include "polymeric glasses", which are compositions composed of aqueous solutions comprising silicates and/or polysilicates, silanes and sodium and/or lithium hydroxides applied to said metal surfaces in thin films which, once subjected to baking at suitable temperatures for the necessary times, form a protective vitreous layer (in this regard see, for example, WO 1995008515, U.S. Pat. Nos. 516,400, 4,162,169, 3,341,469, US 2006/0086281, U.S. Pat. Nos. 6,162,498, 8,173,221 B2).

The treatment guarantees resistance to oxidation, heat and corrosive substances and facilitates cleaning.

In order to perform their action effectively, said vitreous films must guarantee optimal adhesion and can be characterized by transparency.

It is also known that silver has an effective antibacterial action and that a surface treated with a coating based on silver salts or nanoparticles releases silver ions that interact with bacteria, destroying the cell membranes, although it is normally necessary to add large amounts of silver to the compositions to which this property is to be imparted, which heavily influences the final results, for example causing yellowing and tarnishing of materials.

Naturally, it would be important to be able to also add an antibacterial action to the simple protective action and to supply the product in different colors to make the industrial application thereof more attractive.

SUMMARY OF THE INVENTION

There are described new vitreous products having antibacterial properties for application to metal surfaces.

DETAILED DESCRIPTION OF THE INVENTION

With the present invention it is possible to solve the aforesaid problem by adding silver salts to known formulations of polymeric glasses comprising sodium and/or potassium silicate solutions, lithium polysilicate solutions, silanes and water-soluble polysiloxane based surfactants.

In fact, it has surprisingly been found that the addition of minimum quantities of silver salts to these known compounds (illustrated in more detail below) enables the desired antibacterial effects to be obtained without influencing the coloring and transparency of the applied films.

Sodium silicate solutions are intended as aqueous solutions of products of formula (I):

$$(Na_2O)_x(SiO_2) \quad (I)$$

where X=0.12-0.27; Y=0.40-0.61.

Potassium silicate solutions are intended as aqueous solutions of products of formula $$K_2SiO_3 \quad (II)$$

while lithium polysilicates solutions are intended as aqueous solutions of lithium polysilicates of formula (III):

$$Li_2Si_5O_{11} \quad (III)$$

In particular, according to the invention aqueous solutions of sodium silicate (I) and/or potassium silicate (II) with concentrations in the range between 35 and 45% by weight, preferably 40% by weight, potassium silicate solutions with concentrations in the range between 35 and 45% by weight, preferably 40% by weight, and aqueous solutions of lithium polysilicates (III) with concentrations in the range between 18 and 25% by weight, preferably 20% by weight, are used. The ratio between the solution of lithium polysilicate and the solution of sodium and/or potassium is normally in the range between 1.25 and 1.57, preferably 1.30. Among the silanes, those able to easily hydrolyze in aqueous solutions and with functional groups that in turn have the property of being reactive against the silicate matrix, i.e. able to bond chemically so as to facilitate formation of the vitreous network are preferred, such as silanes with epoxy, amine and vinyl functions, are preferable. Examples of silanes useful according to the invention are: (3-glycidoxypropyl) trimethoxysilane (IV), vinyl-trimethoxysilane (V), N-2-aminoethyl-3-aminopropyl-trimethoxysilane (VI), 3-aminopropyl-triethoxysilane (VII), methyl-triethoxysilane (VIII), methyl-trimethoxysilane (IX).

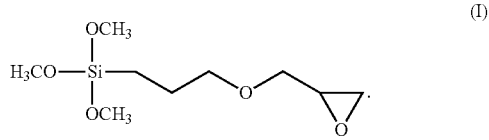

(I)

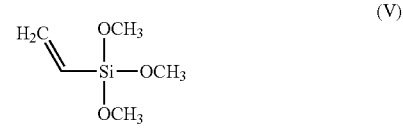

(V)

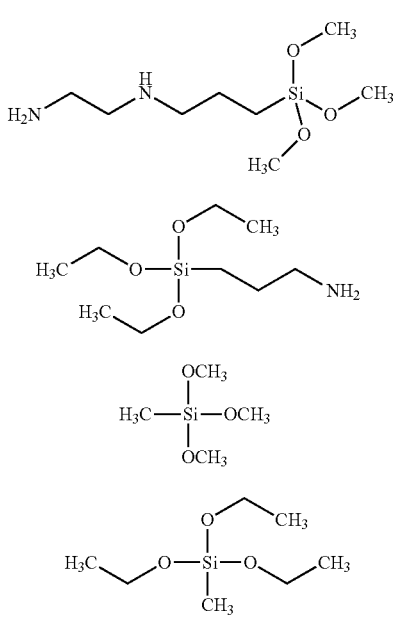

The amount of silane is normally in the range between 0 and 20.0% by weight, preferably 1.30% by weight.

Normally, siloxane based surfactants (such as BYK348® by BYK) are present in amounts in the range between 0 and 0.05% by weight with respect to the weight of the formulation, preferably in the percentage of 0.02% by weight.

Silver salts are intended, for example, as: silver nitrate, silver sulfate.

If preferred, in place of the silver salts as defined above, suitable amounts of silver in the form of nanometric particles, either in suspension or as powder, can be used.

The amount of silver salt added to the composition without changing its chromatic characteristics is in the range between 0.005% and 0.2% by weight with respect to the weight of the formulation, preferably between 0.01% and 0.05% by weight.

If silver in the form of nanoparticles is used, this can be added in amounts in the range between 0.003% and 0.14% by weight if powder, or in amounts in the range between 0.075% and 3.5% and preferably between 0.175-0.75% by weight if in suspension containing 4% by weight of silver in the form of nanometric particles.

Given the small amount of silver salts added to the compositions according to the invention, this does not affect any optional colorants added and it is therefore possible to obtain completely transparent antibacterial films and colored films (opaque or transparent according to the colorant used) without the negative effects of yellowing caused by the addition of silver salts in the usual amounts.

In the present invention, the term colorant is intended as an additive whose function is to impart a coloring to the coating once it has been subjected to the suitable thermal baking cycle. This means that the coloring of the solution does not necessarily correspond to the color that the coating will have at the end of the process.

However, it is possible to obtain a wide range of colors as described below.

A possible yellow coloring can be obtained using silver nitrate in amounts in the range between 0 and 2% by weight with respect to the weight of the formulation, preferably between 0.1 and 0.9% by weight, resulting in a necessarily antibacterial colored film.

It is possible to obtain a black coloring using carbon black. In this case, it is preferable to use aqueous suspensions of carbon black as they facilitate the dispersibility thereof in the solution. Normally, carbon black is present in amounts in the range between 0 and 10% by weight with respect to the weight of the formulation, preferably between 6 and 8% by weight.

Among the colorants of organic nature, molecules deriving from the family of the phthalocyanines (such Copper (II) phthalocyanine by Aldrich and Luconyl NG Blue 6900 by Basf), the oxazines (such as Luconyl NG Violet 5894 by Basf), of the quinacridones (such as Luconyl NG Magenta 4790 by Basf), of the quinophthalones (such as Luconyl NG Yellow 0962 by Basf) and of the fluoresceins (such as Eosin Y by Aldrich) are preferable. Normally the colorant is present in amounts in the range between 0 and 5% by weight with respect to the weight of the formulation, preferably between 2 and 4% by weight.

The compositions according to the invention can be easily obtained with essentially known methods.

The aqueous solution of lithium polysilicate is mixed with the solution of sodium or potassium silicate and with deionized water by stirring; silane is added to the mixture thus obtained, continuing to stir. The polysiloxane based surfactant is then added to the mixture. The final solution is filtered and the colorant is added. It is then applied directly (for example by spraying) to the metal surface to be treated, which is subsequently dried and baked at the required temperature.

The metal application surface can consist of: steel, copper, brass.

It is thus possible to obtain well adhered vitreous films without defects by applying the product directly to the metal surface without using any primer; moreover, the product thus formulated can be applied at a greater thickness than normally used without any problems of cracking and adhesion to the substrate, which instead are typical in known products if applied without primer.

Some examples of preparation and use of the compositions according to the invention are indicated below.

EXAMPLE 1

Transparent Coating 38.63 g of an aqueous solution containing 20% by weight of lithium polysilicate (Aldrich), with a pH of around 14, is mixed with 29.97 g of a solution containing 38% by weight of sodium silicate (Aldrich), with a pH of around 14, and with 31.40 g of deionized water. The mixture is stirred and 1.30 g of 3-glycidoxypropyltrimethoxysilane (ABCR) is added. The mixture is applied to a steel plate by spraying, dried at 100° C. and baked at 250° C. for 10 minutes. The thickness of the film obtained is around 1 μm.

EXAMPLE 2

Antibacterial Transparent Coating 15.00 g of an aqueous solution containing 20% by weight of lithium polysilicate (Aldrich), with a pH of around 14, is mixed with 11.50 g of a solution containing 38% by of weight sodium silicate (Aldrich), with a pH of around 14, and with 72.20 g of deionized water. The mixture is stirred and 1.30 g of 3-glycidoxypropyltrimethoxysilane (ABCR) is added. It is maintained under stirring for at least one hour. 0.02% by weight of BYK 348 (BYK) is added to the product obtained. The final solution is filtered before application. Finally, 2 g of a solution containing 1% by weight of silver nitrate (Safinet) in 32% ammonia (Aldrich) is added to 100 g of this product and mixed until complete homogenization. The mixture is applied to a steel plate by spraying, dried at 100° C. and baked at 250° C. for 10 minutes. The thickness of the film obtained is around 1 µm.

EXAMPLE 3

Black Colored Coating 15.00 g of an aqueous solution containing 20% by weight of lithium polysilicate (Aldrich), with a pH of around 14, is mixed with 11.50 g of a solution containing 38% by weight of sodium silicate (Aldrich), with a pH of around 14, and with 72.20 g of deionized water. The mixture is stirred and 1.30 g of 3-glycidoxypropyltrimethoxysilane (ABCR) is added. It is maintained under stirring for at least one hour. 0.02% by weight of BYK 348 (BYK) is added to the product obtained. The final solution is filtered before application. 2 g of a solution containing 1% by weight of silver nitrate (Safinet) in 32% ammonia (Aldrich) is added to 100 g of this product and mixed until complete homogenization and finally 8.0 g of an aqueous suspension of carbon black (Carbon Black CAB-O-JET 352, Cabot) is added thereto and mixed until complete homogenization. The mixture is applied to a steel plate by spraying, dried at 100° C. and baked at 250° C. for 10 minutes. The thickness of the film obtained is around 1 µm of black color.

EXAMPLE 4

Blue Colored Coating 15.00 g of an aqueous solution containing 20% by weight of lithium polysilicate (Aldrich), with a pH of around 14, is mixed with 11.50 g of a solution containing 38% by weight of sodium silicate (Aldrich), with a pH of around 14, and with 72.20 g of deionized water. The mixture is stirred and 1.30 g of 3-glycidoxypropyltrimethoxysilane (ABCR) is added. It is maintained under stirring for at least one hour. 0.02% by weight of BYK 348 (BYK) is added to the product obtained. The final solution is filtered before application. 2 g of a solution containing 1% by weight of silver nitrate (Safinet) in 32% ammonia (Aldrich) is added to 100 g of this product and mixed until complete homogenization and finally 2.0 g of a blue pigment (Copper (II) phthalocyanine, tetrasulfonic acid sodium salt, Aldrich) is added thereto and mixed until complete homogenization. The mixture is applied to a steel plate by spraying, dried at 100° C. and baked at 250° C. for 10 minutes. The thickness of the film obtained is around 1 µm of blue color.

EXAMPLE 5

Yellow Colored Coating 15.00 g of an aqueous solution containing 20% by weight of lithium polysilicate (Aldrich), with a pH of around 14, is mixed with 11.50 g of a solution containing 38% by weight of sodium silicate (Aldrich), with a pH of around 14, and with 72.20 g of deionized water. The mixture is stirred and 1.30 g of 3-glycidoxypropyltrimethoxysilane (ABCR) is added. It is maintained under stirring for at least one hour. 0.02% by weight of BYK 348 (BYK) is added to the product obtained. The final solution is filtered before application. Finally, 2.0 g of a solution containing 5% by weight of silver nitrate (Safinet) in 32% ammonia (Aldrich) is added to 100 g of this product and mixed until complete homogenization. The mixture is applied to a steel plate by spraying, dried at 100° C. and baked at 250° C. for 10 minutes. The thickness of the film obtained is around 1 µm of yellow color.

EXAMPLE 6

Red Colored Coating 15.00 g of an aqueous solution containing 20% by weight of lithium polysilicate (Aldrich), with a pH of around 14, is mixed with 11.50 g of a solution containing 38% by weight of sodium silicate (Aldrich), with a pH of around 14, and with 72.20 g of deionized water. The mixture is stirred and 1.30 g of 3-glycidoxypropyltrimethoxysilane (ABCR) is added. It is maintained under stirring for at least one hour. 0.02% by weight of BYK 348 (BYK) is added to the product obtained. The final solution is filtered before application. 2 g of a solution containing 1% by weight of silver nitrate (Safinet) in 32% ammonia (Aldrich) is added to 100 g of this product and mixed until complete homogenization and finally 1.5 g of a red pigment (Eosin Y, Aldrich) is added thereto and mixed until complete homogenization. The mixture is applied to a steel plate by spraying, dried at 100° C. and baked at 250° C. for 10 minutes. The thickness of the film obtained is around 1 µm of red color.

EXAMPLE 7

Green Colored Coating 15.00 g of an aqueous solution containing 20% by weight of lithium polysilicate (Aldrich), with a pH of around 14, is mixed with 11.50 g of a solution containing 38% by weight of sodium silicate (Aldrich), with a pH of around 14, and with 72.20 g of deionized water. The mixture is stirred and 1.30 g of 3-glycidoxypropyltrimethoxysilane (ABCR) is added. It is maintained under stirring for at least one hour. 0.02% by weight of BYK 348 (BYK) is added to the product obtained. The final solution is filtered before application. 2 g of a solution containing 1% by weight of silver nitrate (Safinet) in 32% ammonia (Aldrich) is added to 100 g of this product and mixed until complete homogenization and finally 1.0 g of a blue pigment (Copper (II) phthalocyanine, tetrasulfonic acid sodium salt, Aldrich) and 1.0 g of a solution containing 5% by weight of silver nitrate (Safinet) in 32% ammonia (Aldrich) are added thereto and mixed until complete homogenization. The mixture is applied to a steel plate by spraying, dried at 100° C. and baked at 250° C. for 10 minutes. The thickness of the film obtained is around 1 µm of green color.

EXAMPLE 8

Blue Colored Coating 15.00 g of an aqueous solution containing 20% by weight of lithium polysilicate
(Aldrich), with a pH of around 14, is mixed with 11.50 g of a solution containing 38% by weight of sodium silicate (Aldrich), with a pH of around 14, and with 72.20 g of deionized water. The mixture is stirred and 1.30 g of 3-glycidoxypropyltrimethoxysilane (ABCR) is added. It is maintained under stirring for at least one hour. 0.02% by weight of BYK 348 (BYK) is added to the product obtained.

The final solution is filtered before application. 2 g of a solution containing 1% by weight of silver nitrate (Safinet) in 32% ammonia (Aldrich) is added to 100 g of this product and mixed until complete homogenization and finally 3.5 g of a blue pigment (Luconyl NG Blue 6900, Copper(II) phthalocyanine, Basf) is added thereto and mixed until complete homogenization. The mixture is applied to a steel plate by spraying, dried at 100° C. and baked at 250° C. for 10 minutes. The thickness of the film obtained is around 1 μm of blue color.

EXAMPLE 9

Green Colored Coating 15.00 g of an aqueous solution containing 20% by weight of lithium polysilicate (Aldrich), with a pH of around 14, is mixed with 11.50 g of a solution containing 38% by weight of sodium silicate (Aldrich), with a pH of around 14, and with 72.20 g of deionized water. The mixture is stirred and 1.30 g of 3-glycidoxypropyltrimethoxysilane (ABCR) is added. It is maintained under stirring for at least one hour. 0.02% by weight of BYK 348 (BYK) is added to the product obtained. The final solution is filtered before application. 2 g of a solution containing 1% by weight of silver nitrate (Safinet) in 32% ammonia (Aldrich) is added to 100 g of this product and mixed until complete homogenization and finally 3.5 g of a green pigment (Luconyl NG Green 9360, Copper (II) halogenated phthalocyanine, Basf) is added thereto and mixed until complete homogenization. The mixture is applied to a steel plate by spraying, dried at 100° C. and baked at 250° C. for 10 minutes. The thickness of the film obtained is around 1 μm of green color.

EXAMPLE 10

Violet Colored Coating 15.00 g of an aqueous solution containing 20% by weight of lithium polysilicate (Aldrich), with a pH of around 14, is mixed with 11.50 g of a solution containing 38% by weight of sodium silicate (Aldrich), with a pH of around 14, and with 72.20 g of deionized water. The mixture is stirred and 1.30 g of 3-glycidoxypropyltrimethoxysilane (ABCR) is added. It is maintained under stirring for at least one hour. 0.02% by weight of BYK 348 (BYK) is added to the product obtained. The final solution is filtered before application. 2 g of a solution containing 1% by weight of silver nitrate (Safinet) in 32% ammonia (Aldrich) is added to 100 g of this product and mixed until complete homogenization and finally 3.5 g of a violet pigment (Luconyl NG Violet 5894, Basf) is added thereto and mixed until complete homogenization. The mixture is applied to a steel plate by spraying, dried at 100° C. and baked at 250° C. for 10 minutes. The thickness of the film obtained is around 1 μm of violet color.

EXAMPLE 11

Magenta Colored Coating 15.00 g of an aqueous solution containing 20% by weight of lithium polysilicate (Aldrich), with a pH of around 14, is mixed with 11.50 g of a solution containing 38% by weight of sodium silicate (Aldrich), with a pH of around 14, and with 72.20 g of deionized water. The mixture is stirred and 1.30 g of 3-glycidoxypropyltrimethoxysilane (ABCR) is added. It is maintained under stirring for at least one hour. 0.02% by weight of BYK 348 (BYK) is added to the product obtained. The final solution is filtered before application. 2 g of a solution containing 1% by weight of silver nitrate (Safinet) in 32% ammonia (Aldrich) is added to 100 g of this product and mixed until complete homogenization and finally 3.5 g of a magenta pigment (Luconyl NG Magenta 4790, Basf) is added thereto and mixed until complete homogenization. The mixture is applied to a steel plate by spraying, dried at 100° C. and baked at 250° C. for 10 minutes. The thickness of the film obtained is around 1 μm of magenta color.

EXAMPLE 12

Yellow Colored Coating 15.00 g of an aqueous solution containing 20% by weight lithium polysilicate (Aldrich), with a pH of around 14, is mixed with 11.50 g of a solution of containing 38% by weight sodium silicate (Aldrich), with a pH of around 14, and with 72.20 g of deionized water. The mixture is stirred and 1.30 g of 3-glycidoxypropyltrimethoxysilane (ABCR) is added. It is maintained under stirring for at least one hour. 0.02% by weight of BYK 348 (BYK) is added to the product obtained. The final solution is filtered before application. 2 g of a solution containing 1% by weight silver nitrate (Safinet) in 32% ammonia (Aldrich) is added to 100 g of this product and mixed until complete homogenization and finally 3.5 g of a yellow pigment (Luconyl NG Yellow 0962, Basf) is added thereto and mixed until complete homogenization. The mixture is applied to a steel plate by spraying, dried at 100° C. and baked at 250° C. for 10 minutes. The thickness of the film obtained is around 1 μm of yellow color.

An antibacterial test was performed on the sample of example 2.

| SAMPLE | INOCULUM | RECOVERY 24 h | R (%) | R (log) |
|---|---|---|---|---|
| Untreated steel | 37 * 10$^5$ | 62.3 * 10$^6$ | | |
| Test 1 | 37 * 10$^5$ | 64.7 * 10$^4$ | 98.9 | 1.9 |
| Test 2 | 37 * 10$^5$ | 89.6 * 10$^4$ | 98.6 | 1.8 |

Resistance of the coating to alkaline attack was tested (test performed maintaining the samples in an aqueous solution containing 5% sodium hydroxide for 16 hours).

| Sample | Result |
|---|---|
| Black Carbon Black | OK |
| Red Eosin Y | Partial aggression |
| Yellow Ag | OK |
| Green Ag/Cu phthalocyanine | Partial aggression |
| Blue Cu phthalocyanine | Partial aggression |
| Luconyl Blue 6900 | OK |
| Luconyl Green 8730 Basf | OK |
| Luconyl Magenta 4790 Basf | Slight loss of color |
| Luconyl Yellow EH 0962 Basf | Slight loss of color |
| Luconyl Violet 5894 Basf | Slight loss of color |

The invention claimed is:
1. Polymeric glasses having antibacterial properties for the application to metal surfaces comprising sodium and/or potassium silicate solutions, lithium polysilicate solutions, silanes, water-soluble polysiloxane based surfactants, and silver salts in an amount in the range between 0.005 and

0.2% by weight with respect to the weight of the formulation, wherein all above materials are present in the formulation.

2. Polymeric glasses according to claim 1, wherein said silver salts are present in an amount in the range between 0.01 and 0.05% by weight with respect to the formulation weight.

3. Polymeric glasses according to claim 1, wherein said silver salts are selected from silver nitrate and silver sulfate.

4. Polymeric glasses according to claim 1, wherein the silver salts are in the form of nanoparticles in suspension or as powder.

5. Polymeric glasses according to claim 1, further comprising colorants.

6. Polymeric glasses according to claim 5, wherein said colorants are able to impart a coloring to a coating once it has been subjected to a suitable thermal baking cycle.

7. Polymeric glasses according to claim 6, wherein said colorants are selected from the group consisting of: carbon black, phthalocyanines, oxazines, quinacridones, quinophthalones, and fluoresceins.

8. Polymeric glasses according to claim 6, wherein said colorants are present in an amount in the range between 0 and 5% by weight with respect to the formulation weight.

9. Polymeric glasses according to claim 8, wherein said colorants are present in an amount in the range between 2 and 4% by weight with respect to the formulation weight.

* * * * *